United States Patent [19]

Greten

[11] 4,065,030

[45] Dec. 27, 1977

[54] APPARATUS FOR METERING PARTICLES CONTAINING LIGNOCELLULOSE, SUCH AS WOOD CHIPS OR THE LIKE, WHICH ARE TO BE PROVIDED WITH BINDERS

[75] Inventor: Berndt Greten, Springe, Germany

[73] Assignee: Bison-Werke Bahre & Greten GmbH & Co. KG, Germany

[21] Appl. No.: 688,320

[22] Filed: May 20, 1976

[30] Foreign Application Priority Data

May 20, 1975 Germany .................. 7515958[U]

[51] Int. Cl.² .................................................. B67D 5/14
[52] U.S. Cl. ............................................................ 222/55
[58] Field of Search ............................. 222/55, 52, 57

[56] References Cited

U.S. PATENT DOCUMENTS

| 2,925,197 | 2/1960 | Frebel | 222/57 X |
| 3,186,596 | 6/1965 | Badgett | 222/57 |

FOREIGN PATENT DOCUMENTS

| 1,648,128 | 7/1973 | Germany | 222/55 |

Primary Examiner—Stanley H. Tollberg
Assistant Examiner—Hadd Lane
Attorney, Agent, or Firm—Craig & Antonelli

[57] ABSTRACT

An apparatus for metering particles containing lignocellulose employs a measuring and control unit. This unit compensates volumetric fluctuations in the bulk density of particles in a metering tank moving at constant speed, through the use of radioactive detection.

6 Claims, 1 Drawing Figure

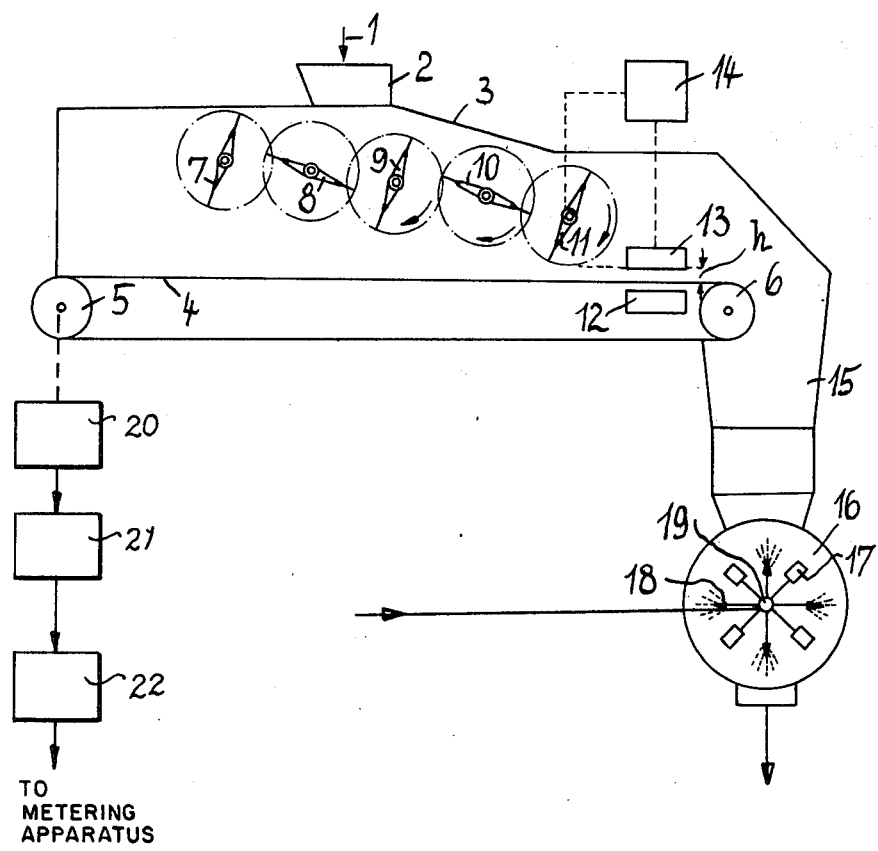

APPARATUS FOR METERING PARTICLES CONTAINING LIGNOCELLULOSE, SUCH AS WOOD CHIPS OR THE LIKE, WHICH ARE TO BE PROVIDED WITH BINDERS

FIELD OF THE INVENTION

The invention relates to an apparatus for the metering of particles to be provided with binders, such as wood chips or the like, for the manufacture of panels, especially chipboards, wherein constant amounts of chips and constant quantities of glue corresponding to the amounts of chips are fed per time unit to a continuously operating mixing machine.

BACKGROUND OF THE INVENTION

It is known that an exactly metered feeding of the quantity of binder to be added to a specific amount of wood chips or the like is decisive for the quality of the panels to be manufactured. To attain this objective, continuously operating metering devices have been developed for gluing machines, which operate with metering scales feeding constant amounts of chips in a batchwise manner per time unit, wherein either the thus-conveyed weight of the chips, with a constant belt speed, is solely adapted to the required output, or wherein the belt-type scales merely serve for registering an incoming stream of chips. In other words, it is known that there is a dependency between the output of the chip conveyor unit, on the one hand, and the binder metering pump, on the other hand. It is desirable to provide that the quantitative ratio of chips and glue generally remains constant as seen over a long period of time (DAS [German Published Application] No. 1,195,940, column 1).

To solve this well-known problem, a controllable mechanical coupling of the drive of the endless scale belt with the drive mechanism for the binder metering pump has been provided when using a metering tank for the dry chips, a belt scale, and a binder metering pump, wherein the outputs of the belt scale and the binder metering pump are dependent on each other.

In spite of the desire to take care that the quantitative ratio of chips and glue remain constant, this objective cannot be attained by means of the above directions, because difficulties can occur in several kinds of chips in maintaining the weight-wise delivery of the chips at a constant value at all times. Consequently, a secondary control procedure is necessary, which is achieved by exerting a corresponding effect on the binder metering pump. However, such a secondary control is undesirable, because this complicates the structure of the metering device. The invention starts with the consideration that the solutions heretofore provided for a satisfactory metering procedure strove to maintain the quantitative ratio of chips and glue generally at a constant value over a long period of time, and that consequently the glue output had to be adapted to the amount of chips delivered. As a result, on account of this secondary control, the amount of chips present in the gluing machine will, at one time, be provided with an excessive amount of glue and, at another time, be supplied with an insufficient amount of glue (DOS [German Unexamined Laid-Open Application] No. 2,138,082, second paragraph on page 3).

SUMMARY OF THE INVENTION

Consequently, the invention starts with the idea that it is absolutely necessary to avoid not only a possible oversupply of glue, but also a possible undersupply of glue to the chip material or the like. Therefore, the invention is based on the known problem of maintaining the quantitative ratio of chips and glue at a constant value at all times. To attain this objective, the invention provides that variations in the bulk density of an amount of particles containing lignocellulose, moved continuously in the metering tank at constant speed, are measured by means of radioactive radiation or the like and are compensated for volumetrically before these particles are fed to the mixing machine. Thereby, the amount of glue need no longer be subjected to a secondary control, but rather the amount of glue can be maintained at all times at a constant value, because the amount of chips is, after all, maintained constant. One, then, need only take care that the gluing machine is fed with a quantity of glue which always remains constant, which can be obtained without any great difficulties.

BRIEF DESCRIPTION OF THE INVENTION

In accordance with a preferred embodiment, the invention starts with an arrangement for the metering of wood chips or other chip-like or fibrous substances with binders, such as glue or glue with additives, this arrangement being equipped with a metering tank provided with smoothing elements and a levelling rake, the bottom of this tank consisting of a bottom belt guided over deflector rolls and being drivable at a constant speed, this belt feeding the material present in the metering tank to a gluing mixer in communication with a pump conveying binder from a storage bin, and it is proposed to arrange at the bottom run of the endless bottom belt, between the levelling rake and the deflector roll corresponding to the delivery point, a radioactive radiation-emitting device or the like serving for the vertical adjustment of the levelling rake, this radioactive radiation-emitting device comprising a pulse generating means for a vibrating capacitor in order to be able to compensate or sense volumetrically any fluctuations in the bulk density. Just as the bottom belt feeds chips or the like to the gluing machine, the latter must also be supplied with the corresponding amount of binder, which remains constant at all times. To attain this objective, it is advantageous to couple a deflector roll of the bottom belt with a pulse generating means, the pulses of which can be fed via a pulse counter to a control device for the metering of the glue or glue liquor.

BRIEF DESCRIPTION OF THE DRAWING

The single FIGURE is a diagrammatic illustration of the metering apparatus in accordance with the present invention.

DETAILED DESCRIPTION OF THE INVENTION

In a metering tank 3, a radiation-emitting device 12, 13 is arranged between a vertically adjustable levelling rake 11 and the delivery end of an endless bottom belt 4. The part 13 of this device contains a pulse generating means for a vibrating capacitor-amplifier 14 with a control element in the cycles of "measuring," "adjusting," and "waiting time." The control element of the amplifier 14 is connected to the verticaly adjustable levelling rake 11.

The unit comprising parts 11-14 serves for the continuous measurement and for the compensation or sensing of any fluctuations in the weight per unit area of a preliminary chip layer having a specific height $h$ and being delivered, on the top run of the endless bottom belt 4 and at a constant rotational speed of this belt, into a drop chute 15 and passing immediately thereafter into a conventional gluing device 16. The measuring principle, in this connection, resides in that preferably a radioisotope is utilized which is adapted in the penetrability of its radiation to the preliminary chip layer material. The radioactive radiation emanating from the source 12 of radiation penetrates the preliminary layer of chips or the like moved continuously toward the delivery end of the endless bottom belt 4, a portion of the radiation being absorbed by the preliminary layer. The remaining portion of the radioactive radiation enters the radiation detector 13 comprising an ionizing chamber. In the latter, the entering radioactive radiation generates an ionization current which produces a voltage at a high-ohmic resistor, this voltage being the lower, the larger the weight per unit area of the chip layer. This voltage is compensated by a desired value voltage. The desired value voltage can be read off from a scale calibrated with weight per unit area values; on this scale, the desired nominal value of the chip layer to be measured can be preset. If the detected actual value of the chip layer deviates from the desired value, the pulse formed from the difference between the actual voltage and the desired voltage passes to the vibrating capacitor-amplifier 14. From here, the pulses pass to a deviation indicator as well as to a writer which indicates and/or records the deviations. The "waiting time" in the control section of the amplifier denotes the time required by the chip layer for traversing the distance from the adjusting location disposed below the vertically adjustable levelling rake to the measuring location, i.e. the radiation detector 13 with an ionizing chamber. Here, the chip layer is measured for a certain period of time. If the actual value deviates from the desired value, the adjusting operation of the levelling rake 11 is initiated by a pulse of the control section of the amplifier 14 in accordance with the "adjusting" cycle. This cycle lasts until the preliminary chip layer, corrected with respect to volume and weight, has reached the measuring point between the source 12 of radiation and the radiation detector 13 with an ionizing chamber. Then, the subsequent control period starts, with "measuring," "adjusting," and "waiting time."

In order to be able to vertically adjust the levelling rake 11, a worm gear motor, receiving the pulses from the control section "adjustment" of the amplifier 14, operates a lifting means suspended on sliding bearings of the levelling rake 11. For the sake of clarity, the drawing merely indicates schematically the control-technical coupling of the amplifier 14 with the levelling rake 11.

A pulse generator device 20 is coupled to one guide roll 5 of the endless bottom belt 4, the pulses of this device being counted by a pulse counter means 21. The pulses are fed to a control or regulating device 22, the pulses of which operate appropriate parts of the glue or glue liquor metering apparatus; these parts are known to those skilled in the art and have not been illustrated.

I claim:

1. Apparatus for metering particles containing lignocellulose, such as wood chips or the like, and binders, for the continuous manufacture of panels, especially chipboards, wherein constant amounts of particles and constant quantities of binder corresponding to the amounts of particles are fed per time unit to a continuously operating mixing machine, comprising a measuring and control unit which measures by radioactive radiation and senses volumetrically any fluctuations in the bulk density of a quantity of said lignocellulose-containing particles; wherein said apparatus for metering said particles and binders maintains the quantitative ratio of said particles and binders at a constant value, with a metering tank equipped with levelling elements and a levelling rake, the metering tank having a bottom consisting of an endless bottom belt guided over deflector rolls and drivable at a constant speed, said bottom belt feeding the material present in the metering tank to a gluing mixer, said gluing mixer being connected to a pump conveying binder from a storage bin, and wherein a top run of the endless bottom belt is associated, between the levelling rake and the deflector roll corresponding to the delivery point, with a radiation-emitting and receiving device serving for the control device for vertical adjustment of the levelling rake and comprising pulse generating means for a vibrating capacitor in order to sense volumetrically any fluctuations in the bulk density.

2. Apparatus according to claim 1, wherein the deflector roll of the bottom belt is coupled with the pulse generating means, the pulses of which can be fed via a pulse counter to the control device for the glue or glue liquor metering means.

3. Apparatus for metering wood chips or other chip-like and fibrous materials and binders, such as glue or glue with additives, for the manufacture of boards, especially chip boards, for the purpose of keeping constant the quantitative ratio of chips or the like and binders, comprising a metering tank provided with levelling elements and a levelling rake, the bottom of said tank consisting of a bottom belt drivable at a constant speed and guided over deflector rolls, said bottom belt feeding the material present in the metering tank to a gluing mixer, the latter being connected to a pump conveying certain amounts of binder from a storage bin, said amounts of binder always remaining constant, characterized in a radiation measuring and pulse generating means arranged at the top run of the endless bottom belt between the levelling rake and the deflector roll corresponding to the delivery point, the pulse of said pulse generating means controlling the height adjustment of the driven levelling rake.

4. Apparatus for metering particles containing lignocellulose, such as wood chips or the like, and binders, for the continuous manufacture of panels, comprising a metering tank whose floor is formed by a belt guided over deflector rolls and drivable at a constant speed to deliver particles in said metering tank to a discharge end thereof, levelling means in said metering tank for forming a level stream of particles on said belt including a levelling rake capable of movement within said metering tank to adjust the height of said stream of particles at said discharge end of said metering tank, detecting means for measuring the bulk density of said stream of particles by radioactive radiation, and control means responsive to said detecting means for controlling said levelling rake to maintain constant the amount of particles delivered per unit time to the discharge end of said metering tank.

5. Apparatus according to claim 4, further comprising a gluing mixer connected to the discharge end of said metering tank for receiving said stream of particles therefrom, and binder supply means for supplying a constant quantity of binder to said gluing mixer corresponding to the constant amount of particles delivered thereto from said metering tank.

6. Apparatus according to claim 5, wherein a deflector roll of said belt is coupled to a pulse generator, the pulses of which are fed to the pulse counter, said binder supply means being controlled by the output of said pulse counter.

* * * * *